United States Patent
Mantell (10) Patent No.: US 9,186,887 B1
(45) Date of Patent: Nov. 17, 2015

(54) SYSTEM AND METHOD FOR COMPENSATING FOR MALFUNCTIONING EJECTORS OPERATED WITH REFERENCE TO MULTI-LEVEL TONE IMAGE DATA BY ADDING DROPS IN ADJACENT LOCATIONS

(71) Applicant: Xerox Corporation, Norwalk, CT (US)

(72) Inventor: David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/571,977

(22) Filed: Dec. 16, 2014

(51) Int. Cl.
*H04N 1/60* (2006.01)
*B41J 2/045* (2006.01)
*G06K 1/00* (2006.01)

(52) U.S. Cl.
CPC ............ *B41J 2/0451* (2013.01); *B41J 2/04586* (2013.01)

(58) Field of Classification Search
None
See application file for complete search history.

(56) References Cited

U.S. PATENT DOCUMENTS

| | | | |
|---|---|---|---|
| 6,565,180 B2 | 5/2003 | Yu et al. | |
| 2004/0046811 A1 | 3/2004 | D'Souza et al. | |
| 2007/0115507 A1* | 5/2007 | Vladislav et al. | 358/3.13 |
| 2010/0328383 A1* | 12/2010 | Yoshikawa et al. | 347/12 |

* cited by examiner

*Primary Examiner* — Quang N Vo
(74) *Attorney, Agent, or Firm* — Maginot Moore & Beck LLP (57) ABSTRACT

A method compensates for malfunctioning ejectors in inkjet printers and three-dimensional object printers. Multi-level tone data corresponding to a malfunctioning inkjet or ejector is detected and used to modify multi-level tone data surrounding the multi-level tone data corresponding to the malfunctioning ejector and decrement the datum corresponding to a malfunctioning ejector as each surrounding datum is modified. The modification of the surrounding multi-level tone data continues with reference to a datum corresponding to a malfunctioning ejector until the datum corresponding to the malfunctioning ejector falls below a predetermined threshold. The modified multi-level tone data is then used to operate the printer to form an ink image or three-dimensional object.

18 Claims, 8 Drawing Sheets

SYSTEM AND METHOD FOR COMPENSATING FOR MALFUNCTIONING EJECTORS OPERATED WITH REFERENCE TO MULTI-LEVEL TONE IMAGE DATA BY ADDING DROPS IN ADJACENT LOCATIONS

TECHNICAL FIELD

The system and method disclosed in this document relate to printers that eject material with reference to image data having more than two values and, more particularly, to compensating for malfunctioning ejectors in such printers.

BACKGROUND

Drop on demand inkjet technology for producing printed media has been employed in commercial products such as printers, plotters, and facsimile machines. Generally, an inkjet image is formed by selectively ejecting ink drops from a plurality of drop generators or inkjets, which are arranged in a printhead or a printhead assembly, onto an image substrate. For example, the printhead assembly and the image substrate are moved relative to one other and the inkjets are operated to eject ink drops onto the image substrate at appropriate times. The timing of the inkjet activation is performed by a printhead controller, which generates firing signals that activate the inkjets to eject ink. The image substrate may be an intermediate image member, such as a print drum or belt, from which the ink image is later transferred to a print medium, such as paper. The image substrate may also be a moving web of print medium or a series of print medium sheets onto which the ink drops are directly ejected. The ink ejected from the inkjets may be liquid ink, such as aqueous, solvent, oil based, UV curable ink or the like, which is stored in containers installed in the printer. Alternatively, the ink may be loaded in a solid form that is delivered to a melting device, which heats the solid ink to its melting temperature to generate liquid ink that is supplied to a print head.

During the operational life of these imaging devices, inkjets in one or more printheads may become unable to eject ink in response to a firing signal. These inoperative inkjets are also called malfunctioning inkjets or ejectors. The defective condition of the inkjet may be temporary and the inkjet may return to operational status after one or more image printing cycles. In other cases, the inkjet may not be able to eject ink until a purge cycle is performed. A purge cycle may successfully unclog inkjets so they are able to eject ink once again. Execution of a purge cycle, however, requires the imaging device to be taken out of its image generating mode. Thus, purge cycles affect the throughput rate of an imaging device and are preferably performed during periods in which the imaging device is not generating images. Also, the purge cycle may not successfully unclog all inkjets and the printing device may need to function with some number of malfunctioning inkjets until the printhead is replaced.

Digital three-dimensional manufacturing, also known as digital additive manufacturing, is a process of making a three-dimensional solid object of virtually any shape from a digital model. Three-dimensional printing is an additive process in which one or more ejector heads eject successive layers of material on a substrate in different shapes in a manner similar to the operation of ejector heads in an inkjet printer. Three-dimensional printing is distinguishable from traditional object-forming techniques, which mostly rely on the removal of material from a work piece by a subtractive process, such as cutting or drilling. During printing of an object, one or more ejectors can deteriorate by ejecting the material at an angle, rather than normal, to the ejector, ejecting drops that are smaller than an ejector should eject, or by failing to eject any drop at all. An ejector suffering from any of these operational deficiencies is known as a malfunctioning ejector. If the operational status of one or more ejectors deteriorates during object printing, the quality of the printed object may not be assessed until the printing operation is completed. Consequently, object jobs requiring many hours or multiple days can produce objects that do not conform to specifications due to malfunctioning ejectors in the ejector heads. Once such objects are detected, the printed objects are scrapped, restorative procedures are applied to the ejector heads to restore ejector functionality, and the print job is repeated.

Methods have been developed that enable an imaging device to generate images or object layers even though one or more inkjets or ejectors in the imaging device or three-dimensional object printer are unable to eject ink or material. These methods cooperate with image rendering methods to control the generation of firing signals for inkjets in a printhead. Rendering refers to the processes that receive input image data values and then generate output image values. The output image values are used to generate firing signals for printheads to cause the inkjets to eject ink onto the recording media. Once the output image values are generated, a method may use information regarding defective inkjets detected in a printhead to identify the output image values that correspond to a defective inkjet in a printhead. The method then searches to find a neighboring or nearby output image value that can be adjusted to compensate for the defective inkjet. Preferably, an increase in the amount of ink ejected near the defective inkjet may be achieved by replacing a zero or nearly zero output image value with the output image value that corresponds to the defective inkjet. Another method increases neighboring or nearby output image values to boost the amount of ink to be ejected by a plurality of inkjets in the vicinity of the defective inkjet. Another method is able to compensate for the defective inkjet because a normalization process may be used to establish a maximum output image value for inkjets that is less than the output value that causes an inkjet to eject the maximum amount of ink that can be ejected by an inkjet. Thus, an output image value can be increased beyond the normalized maximum output image value to enable an inkjet to eject an amount of ink corresponding to the maximum output value plus some incremental amount. By firing several nearby inkjets in this manner, the ejected ink density can approximate the ink mass that would have been ejected had the defective inkjet been able to eject the ink for a missing pixel. Another method may rely on multiple inkjets to print the image levels within a pixel. When one of those ejectors malfunctions some of the ink can be printed with drops from one of the other functioning ejectors within that same pixel location.

Ejector heads have been developed that have inkjets and ejectors that eject multiple drops of ink or material at a single location or that eject drops of different masses or volumes at a location. To represent the multiple sizes or drops at a location in an image data array, the rendering process converts continuous tone, sometimes called contone data, to multi-level tone data. "Multi-level tone data" refers to output data that has more than two values, but fewer values than the permissible range for the contone data. For example, grayscale image data is continuous tone data having a range of 0 to 255. The data in this range of grayscale data can be converted to multi-level tone data having a 0, 1 or 2 to represent no drop, a first volume drop or a second volume drop, respectively. The conversion can be performed by comparing the grayscale value for a pixel to two thresholds of different values. If the grayscale value is less than or equal to the lowest threshold then the multi-level tone data value is zero, if the grayscale value is between the two thresholds then the multi-level tone data value is one, and if the grayscale value is greater than or equal to the highest threshold then the multi-level tone data value is two. Developing a compensation scheme for multi-level tone data corresponding to a malfunctioning inkjet or ejector would be useful.

SUMMARY

A method that compensates for a malfunctioning ejector operated with reference to multi-level tone data includes generating multi-level tone data for at least one material to be ejected onto a substrate with reference to continuous tone data, each multi-level tone datum of the multi-level tone data having at least three possible values and each continuous tone datum having at least one more possible value than the multi-level tone datum, detecting multi-level tone data that corresponds to a malfunctioning ejector that ejects the material, modifying the generated multi-level tone data by decrementing each multi-level tone datum corresponding to the malfunctioning ejector and correspondingly incrementing at least one multi-level tone datum within the generated multi-level tone data in which a multi-level tone datum is stored that is less than a maximum multi-level tone datum, the at least one incremented multi-level tone datum corresponding to at least one functional ejector that is adjacent to the malfunctioning ejector, and operating the at least one functional ejector with reference to the modified generated multi-level tone data to eject ink onto a substrate.

A printer that implements the method for compensating for a malfunctioning ejector operated with reference to multi-level tone data includes a printhead having a plurality of inkjets configured to jet ink drops, a memory, and a controller operatively connected to the printhead and the memory, the controller being configured to: generate multi-level tone data for at least one material to be ejected onto a substrate with reference to continuous tone data, each multi-level tone datum of the multi-level tone data having at least three possible values and each continuous tone datum having at least one more possible value than the multi-level tone datum, detect multi-level tone data that corresponds to a malfunctioning ejector that ejects the material, modify the generated multi-level tone data by decrementing each multi-level tone datum corresponding to the malfunctioning ejector and correspondingly incrementing at least one multi-level tone datum within the generated multi-level tone data in which a multi-level tone datum is stored that is less than a maximum multi-level tone datum, the at least one incremented multi-level tone datum corresponding to at least one functional ejector that is adjacent to the malfunctioning ejector, and operate the at least one functional ejector with reference to the modified generated multi-level tone data to eject ink onto a substrate.

BRIEF DESCRIPTION OF THE DRAWINGS

The foregoing aspects and other features of a system and method for compensating for a malfunctioning ejector operated with reference to multi-level tone data are explained in the following description, taken in connection with the accompanying drawings.

DETAILED DESCRIPTION

For a general understanding of the environment for the system and method disclosed herein as well as the details for the system and method, reference is made to the drawings. In the drawings, like reference numerals designate like elements.

Figure 1:
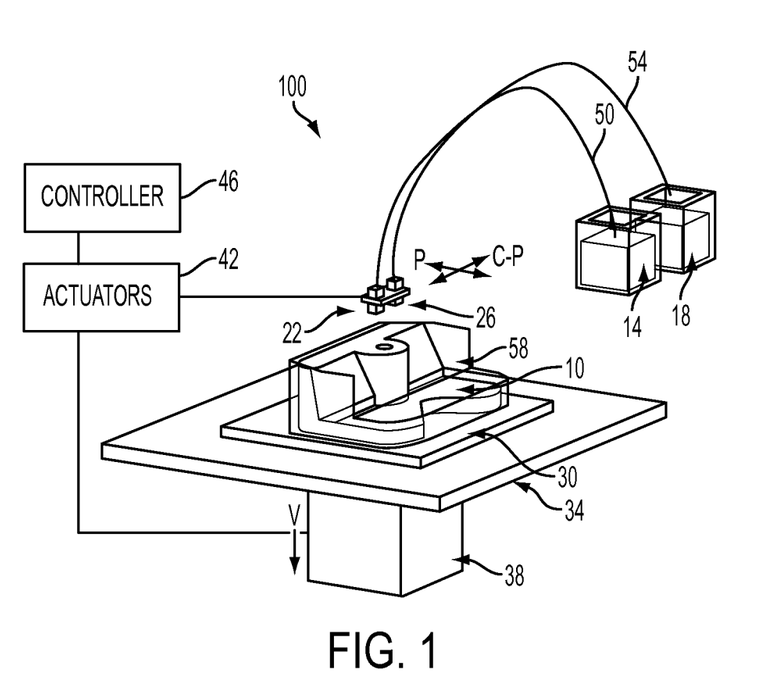
FIG. 1 is a perspective view of a three-dimensional object printer.

FIG. 1 shows a configuration of components in a printing system 100, which produces a three-dimensional object or part 10. As used in this document, the term "three-dimensional object printer" refers to any device that ejects material with reference to image data of an object to form a three-dimensional object. The printing system 100 includes a support material reservoir 14, a building material reservoir 18, a pair of ejector heads 22, 26, a build substrate 30, a planar support member 34, a columnar support member 38, an actuator 42, and a controller 46. Conduit 50 connects ejector head 22 to support material reservoir 14 and conduit 54 connects ejector head 26 to building material reservoir 18. Both ejector heads are operated by the controller 46 with reference to three-dimensional image data in a memory operatively connected to the controller to eject the support and building materials supplied to each respective ejector head. Each datum stored in a single location in the three-dimensional image data is used to operate an ejector to eject material. The intended region on a substrate or previously formed layer in which a drop is intended to land is called a "pixel" in this document. A pixel can receive multiple drops from the same ejector or from different ejectors. The building material forms the structure of the part 10 being produced, while the support structure 58 formed by the support material enables the building material to maintain its shape while the material solidifies as the part is being constructed. After the part is finished, the support structure 58 is removed by washing, blowing, or melting.

The controller 46 is also operatively connected to at least one and possibly more actuators 42 to control movement of the planar support member 34, the columnar support member 38, and the ejector heads 22, 26 relative to one another. That is, one or more actuators can be operatively connected to structure supporting the ejector heads to move the ejector heads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The ejector heads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the ejector heads 22, 26, or by one or more actuators operatively connected to both the columnar support member 38 and the ejector heads 22, 26. These actuators in these various configurations are operatively connected to the controller 46, which operates the actuators to move the columnar member 38, the ejector heads 22, 26, or both in the vertical direction.

Figure 2:
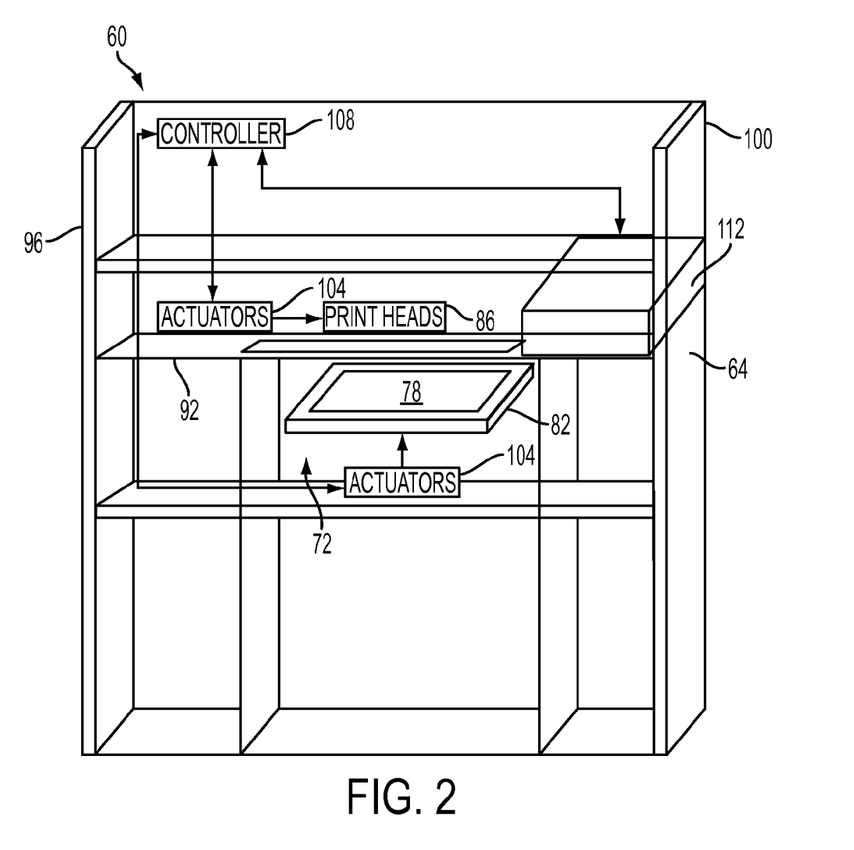
FIG. 2 is a front view of a three-dimensional object printer having a housing that depicts a detection module within the housing that enables inoperative ejectors in a printhead to be detected during a printing operation.

A three-dimensional object printer is shown in FIG. 2. The printer 60 has a housing 64 has a housing 64 in which six compartments are located that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three-dimensional object is formed. In some embodiments, the ejector heads 86 have a length that is approximately equal to the length of the planar support 78 in the direction from the back wall of compartment 72 to the opening at the front of the compartment. In these embodiments, ejector heads 86 are mounted on support member 92 in the space between sidewalls 96 and 100 of housing 64 for linear reciprocating movement only. In other embodiments, the ejector heads 86 have a length that is less than the length of the planar support 78 in the direction from the back wall of compartment 72 to the opening at the front of the compartment. In these embodiments, ejector heads 86 are mounted on support member 92 in the space between sidewalls 96 and 100 of housing 64 for reciprocating movement in two orthogonal directions in a plane above compartment 72. In these various embodiments, one or more actuators 104 are operatively connected to the ejector heads 86. Controller 108 operates the actuators 104 to move the ejector heads 86 either linearly back and forth on support member 92 or to move the ejector heads in two orthogonal directions within a plane. By selectively operating the ejectors in the ejector heads 86, vertically moving the support platform 82, and horizontally moving the ejector heads 86 on the member 92, a three-dimensional object can be formed on the planar support 78.

The housing 64 further includes a detection module 112 that is configured to detect inoperative ejectors in the printer 60. As noted above, if an ejector fails during printing of an object by either completely or partially failing to eject material or by errantly ejecting material in a skewed direction, the object being produced is malformed. The detection module 112 is configured to detect malfunctioning ejectors during object production. In some embodiments, at predetermined times in the printing operation, the controller 108 operates an actuator 104 to move the ejector heads 86 into the detection module 112. The detection module 112 generates a signal to the controller 108 to operate the ejectors in the ejector heads 86 to print a test pattern on a surface of a substrate or other suitable surface. After the test pattern is printed, controller 108 can move the ejector heads 86 out of the detection module. The detection module 112 collects data from the printed test pattern. The data can include image data, thickness data, electrical conductivity data, or any other relevant data. The data can be collected using a sensor, such as an optical sensor, an ultrasonic sensor, or a conductivity sensor. The detection module 112 analyzes the data to identify malfunctioning ejectors. If malfunctioning ejectors are identified, the detection module 112 generates a signal indicative of the defective ejector head and sends it to the controller 108. A signal indicative of the defective ejector head can also be sent or displayed to the operator of the printer.

Inkjet printers are configured in a similar manner as the three-dimensional object printers described above. As is known, a plurality of printheads can be arranged in an array to cover a width of a recording media that moves past the printheads in a process direction. The inkjets within the printheads are operated in a known manner to eject drops of ink onto the media to form ink images. From time to time, the inkjets are operated with reference to test pattern data to form a pattern of marks on the media and image data of the marks on the media is generated with an optical sensor. Using a priori knowledge of the structure of the marks, the image data are analyzed to identify missing or inaccurately placed marks to detect malfunctioning inkjets. As used in this document, the term "ejector" refers to inkjets in printheads and to ejectors in ejector heads of three-dimensional object printers. Likewise, the term "material" refers to ink used to form images on media and materials used to form three-dimensional objects.

Figure 3:
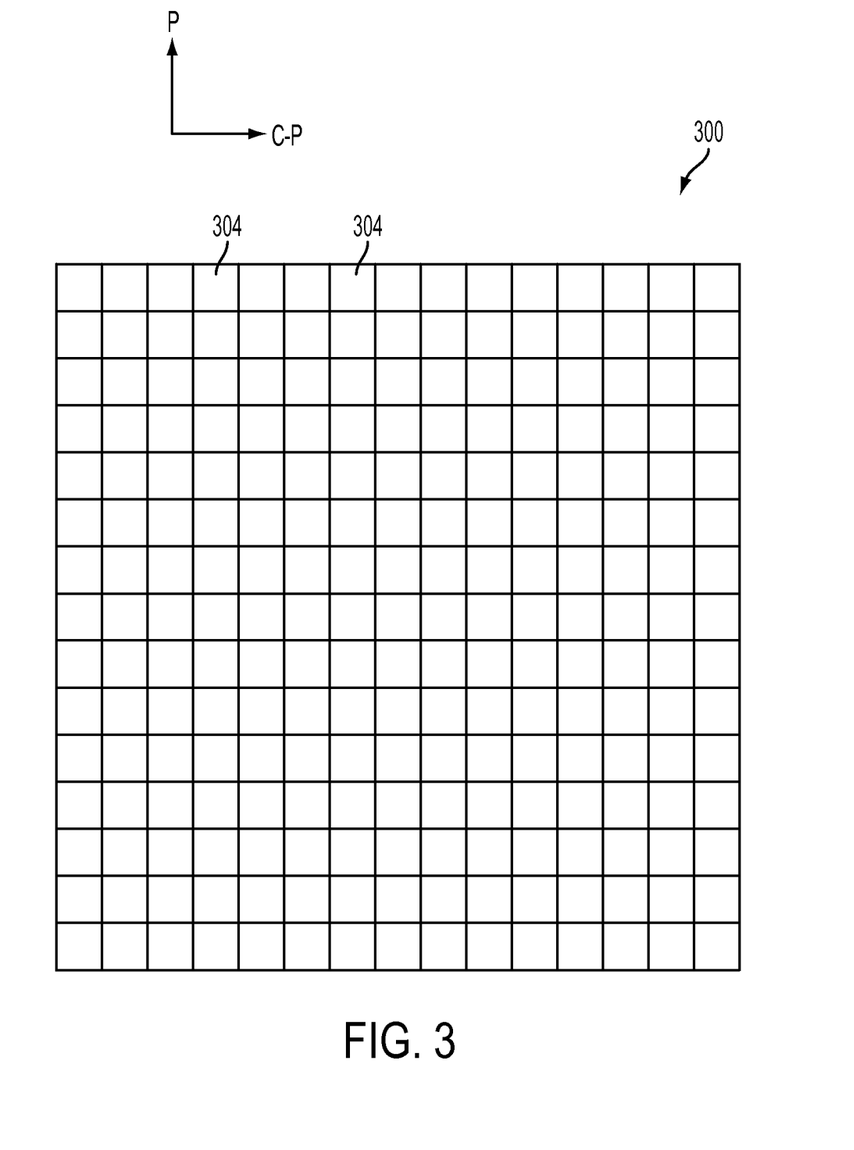
FIG. 3 shows a schematic representation of a two bit per pixel multi-level tone data map used to control an ejector head when printing layers of a three-dimensional object.

FIG. 3 is a schematic representation of a bitmap 300 used by the controller 108 to control the ejector heads 86 when forming a three-dimensional object. The bitmap 300 does not contain data values in each location of the map since it is provided to illustrate a representative bitmap space. In one embodiment, each location would have a datum value of 0, 1, 2 or 3 to represent no drop, a default size drop, a medium drop, which has a volume greater than the default size drop, and a large drop, which has a volume greater than the medium drop. In some embodiments, these values represent a number of drops to be ejected by an ejector to form a pixel. The bitmap 300 could also be used by a controller in a media printer to operate inkjets in printheads to form images on media. In the media printer, one bitmap is generated for each color of ink used in an image to enable the controller to operate the printheads ejecting those colors to form the image. In a three-dimensional object printer, a bitmap for each material ejected in a single layer is generated to operate the ejectors ejecting those materials to form the layer. Additionally, bitmaps are generated for the materials forming each layer in the object to be produced. Therefore, the bitmap 300 comprises a plurality of data values 304 that correspond to one material in a single particular layer within the three-dimensional object to be produced. The data values 304 are logically arranged side by side in linear rows and columns that correspond to pixels to be formed in the particular layer. Each data value 304 comprises a multi-bit data value that indicates whether or not a drop is ejected at the corresponding print location in the particular layer and, if a drop is to be ejected, the volume or number of drops to be ejected. For example, a "0" can indicate that no drop is ejected, a "1" can indicate a 5 picoliter (pl) drop is to be ejected, a "2" can indicate a 7 pl drop is to be ejected, and a "3" can indicate a 12 pl drop is to be ejected. Alternatively, a "1" can represent a single drop is to be ejected into a pixel, a "2" can represent two drops to be ejected into a single pixel and a "3" can indicate three drops are ejected into a single pixel. In another embodiment, a "3" can indicate four drops are ejected into a single pixel.

The controller 108 uses a plurality of such bitmaps to control the ejector head 86 to print a three-dimensional object. As noted above, the controller 108 uses a bitmap for each material in each layer of the three-dimensional object. The materials available to a printer 60 include materials of various primary colors, such as cyan, magenta, yellow, and black; additional materials, such as white, clear and metallic; and support materials, such as wax. The data content of the bitmaps can comprise the result of applying a plurality of thresholds to continuous tone data associated with the three-dimensional object. Particularly, the controller 108 can be configured to receive continuous tone data associated with the three-dimensional object and apply a plurality of thresholds to the continuous tone data to generate multi-level tone data to fill the bitmaps as discussed previously.

When a malfunctioning ejector is identified, the controller 108 begins restorative procedures to compensate for the malfunctioning ejector. Particularly, the controller 108 is configured to identify non-zero data that are associated with pixels printed by the malfunctioning ejector and to modify the multi-level tone data of the neighboring data to compensate for the missing material associated with the malfunctioning ejector. If an identified datum has a multi-level tone data value of "1" then an adjacent datum associated with a functional ejector can be incremented by one to compensate for the material that was to be ejected by the malfunctioning ejector.

As used herein, "adjacent" means that the datum selected for a compensating value is sufficiently close to the datum corresponding to the malfunctioning ejector that placing a drop in the compensating location satisfactorily contributes compensation for failure of the inoperative ejector to print a pixel. For example, in some printer systems, substitute drops are ejected within three pixels from the pixel at which the inoperative ejector would have printed in order to achieve satisfactory compensation. The term "immediately adjacent" refers to a datum that borders a particular datum corresponding to a malfunctioning ejector. As described below, the adjacent datum can be in another bitmap for another color or material or in a bitmap for another layer in a three-dimensional object.

Figure 4A:
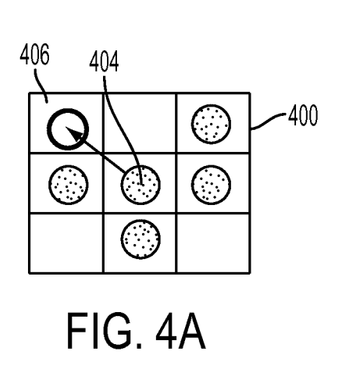
FIG. 4A, FIG. 4B and FIG. 4C illustrate various scenarios for modifying multi-level tone data corresponding to a functional ejector that are adjacent multi-level tone data corresponding to a malfunctioning ejector.
Figure 4B:
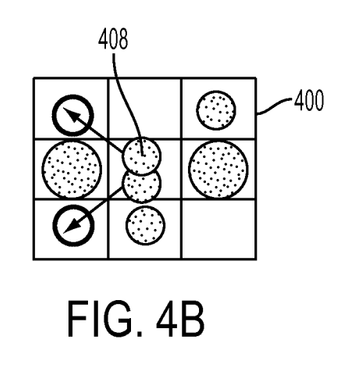
Figure 4C:
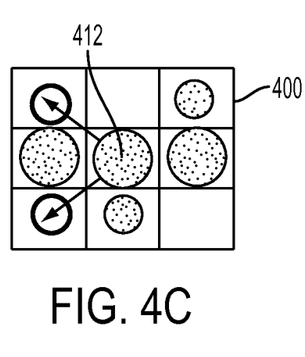

FIG. 4A to FIG. 4C illustrate a scheme for identifying a datum that can be incremented to compensate for at least a portion of a datum corresponding to a malfunctioning ejector. Bitmap portion 400 is a portion of a bitmap for a particular material in a particular layer having a datum 404 that corresponds to a malfunctioning ejector. FIG. 4A depicts a datum 404 corresponding to a malfunctioning ejector that is surrounded by some data that have non-zero values and some that have zero values. The datum 404 is no larger than any non-zero datum surrounding it as indicated by the size of the solid circles in the figure. The processing to compensate for the inability of the malfunctioning ejector to be operated with datum 404 begins by evaluating the data in the two columns immediately adjacent the column in which datum 404 is located and which border the datum 404. The process begins by evaluating the data to the immediate right and left of the pixel 404 by determining whether these data are less than the datum 404 and, if so, incrementing the datum by the smallest increment value, which is "1". Since these data are the same size as datum 404 their values are not changed. The data on the upper row are then evaluated and the upper left datum 406 is "0", which is less than the datum 404. Accordingly, that value is incremented by "1" as indicated by the hollow circle and the datum 404 is decremented by "1", which makes the datum 404 equal to "0". The process terminates at that point since the datum 404 has been fully redistributed.

FIG. 4B depicts a datum 408 corresponding to a malfunctioning ejector that is surrounded by some data that have non-zero values and some that have zero values. The datum 408 represents two drops to be ejected by the malfunctioning ejector, while all of the data surrounding datum 408 eject only one drop or no drops. The processing to compensate for the inability of the malfunctioning ejector to be operated with the datum 404 begins by evaluating the data in the two columns immediately adjacent the column in which the datum 408 is located and which border the datum 408. The process begins by evaluating the data to the immediate right and left of the datum 408 by determining whether the value of those data are less than the datum 408 and, if so, incrementing the datum by the smallest increment value, which is "1". Since these data correspond to a large drop being ejected at those positions and incrementing them increases these data above the datum 408, their values are not changed. The data on the left side of the datum 408 are then evaluated. Since the upper left one is "0", it can be increased without making it greater than the datum 408. Accordingly, that value is incremented by "1" and the datum 408 is decremented by "1", which makes the datum 408 represent a single drop. The remaining datum to the left side of the datum 408 is then evaluated since a portion of datum 408 remains available for redistribution. Since this datum is less than "1", it can be incremented without making it greater than the datum 408. Accordingly, it becomes a "1" and the datum 408 is decremented to "0". The process terminates at that point since the datum 408 has been fully redistributed.

FIG. 4C depicts a datum 412 corresponding to a malfunctioning ejector that is surrounded by some data that have non-zero values and some that have zero values. The datum 412 corresponds to a drop having a volume that is the same as the volume for the drops to be ejected in the positions to the immediate left and right of the datum 412. The processing to compensate for the inability of the malfunctioning ejector to be operated with datum 412 begins by evaluating the data in the two columns immediately adjacent the column in which datum 412 is located and which border the datum 412. The process begins by evaluating the data to the immediate right and left of the datum 412 by determining whether the value of those data can be incremented to a value that is less than the datum 412 and, if so, incrementing the datum by the smallest increment value, which is "1". Since incrementing these data produces drops larger than the volume of the drop corresponding to the datum 412, their values are not changed. The data on the left side of the datum 412 are then evaluated and the upper left one is "0", which is less than the value of datum 412. Accordingly, that value is incremented by "1" to enable the smallest volume drop to be ejected at that position and the datum 412 is decremented by "1", which makes the datum 412 a "1". The remaining datum to the left side of the datum 412 is then evaluated since a portion of datum 412 remains available for redistribution. Since this datum is less than "1", it is incremented to enable the smallest volume drop to be ejected at that position and the datum 412 is decremented to "0". The process terminates at that point since the data associated with datum 412 has been fully redistributed.

Figure 5A:
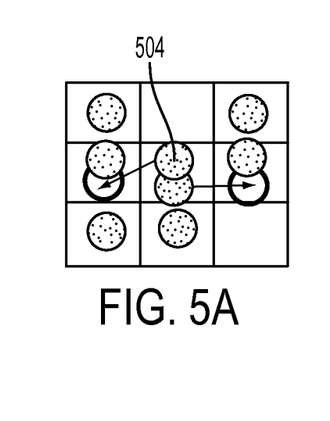
FIG. 5A, FIG. 5B and FIG. 5C illustrate additional scenarios for modifying multi-level tone data corresponding to a functional ejector that are adjacent multi-level tone data corresponding to a malfunctioning ejector.
Figures 5B, 5C:
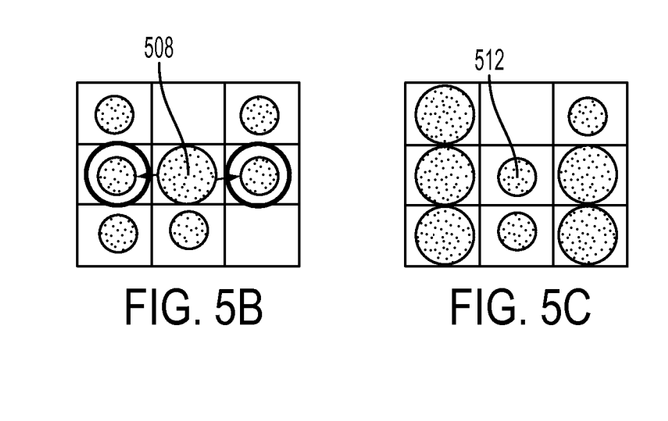

FIG. 5A depicts a scenario in which datum 504 corresponds to two drops of ink to be ejected by a malfunctioning inkjet. The empty circles in the two pixel positions to the immediate left and right of the pixel 504 indicate the datum for each of these positions was initially zero. Thus, each of these positions is less than the datum 504 so they are available for datum distribution. Consequently, a portion of the datum 504 representing a single drop is distributed to the left of datum 504, the remaining portion of the datum 504 is distributed to the right of datum 504 and the datum 504 is replaced with a zero. In FIG. 5B, the datum 508 corresponds to a drop to be ejected by a malfunctioning inkjet having a volume larger than the smallest drop volume. The smaller solid circles in the two data positions to the immediate left and right of the datum 504 indicate the datum for each of these positions corresponds to the smallest volume drop. Thus, each of these positions corresponds to a volume that is less than the volume corresponding to the datum 504 so they are available for datum distribution. Consequently, the datum to the left of pixel 508 is increased to the next larger volume and the datum to the right of datum 508 is similarly increased. The datum 508 is then replaced with a zero. In FIG. 5C, none of the data immediately adjacent to the datum 512 that corresponds to a malfunctioning ejector are smaller than the datum 512 so no distribution to these positions occurs.

Figure 6A:
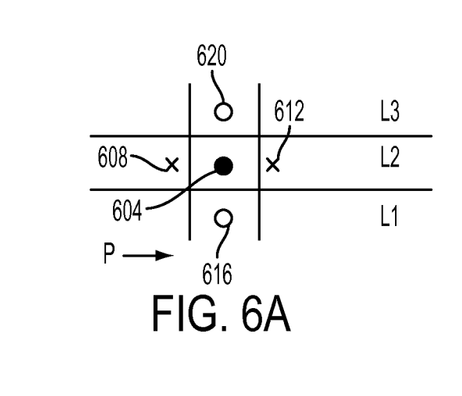
FIG. 6A and FIG. 6B illustrate scenarios for modifying multi-level tone data corresponding to a functional ejector in a three-dimensional object printer that are adjacent multi-level tone data corresponding to a malfunctioning ejector.

A three-dimensional object is formed a layer at a time with either the substrate on which the object is being formed or the ejector head being moved. As stated above, the direction in which the movement occurs during formation of a layer is called the "process direction." In FIG. 6A, a diagram of a search pattern for redistributing data for a malfunctioning ejector in a three-dimensional object printer is depicted. The datum 604 corresponds to the malfunctioning ejector. Since the process direction P of the substrate is from left to right, the data 608, 612 to the left and right of datum 604, respectively, correspond to the malfunctioning ejector so they are not used in the search pattern. Instead, the datum diametrically opposite datum 604 into the plane of FIG. 6A and the datum diametrically opposite datum 604 out of the plane of FIG. 6A are the first two positions evaluated. If they cannot be used for redistribution of the datum 604, then the position 616 in the previous layer L1 that is diametrically opposite datum 604 and the position in the next layer L3 that is diametrically opposite datum 604 are evaluated, if the ejector head is moved between layers to distribute the effect of the malfunctioning ejector about the object. If a portion of the datum 604 remains to be distributed, then the data corresponding with the remaining pixels in layers L1, L2 and L3 that form a cube about datum 604 are evaluated for modification.

Figure 6B:
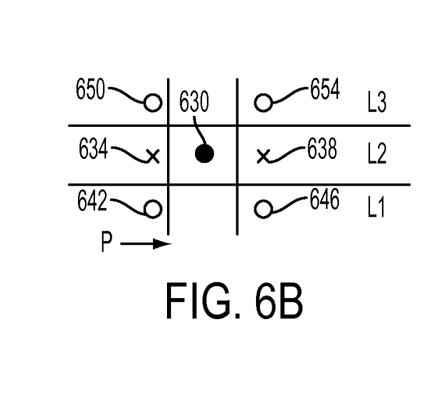

In FIG. 6B, a diagram of a search pattern for redistributing data for a malfunctioning ejector is depicted in which the ejector head is not moved between the formation of layers. The datum 630 corresponds to the malfunctioning ejector. Since the process direction P of the substrate is from left to right, the data to the left and right of datum 630 correspond to the malfunctioning ejector so they are not used in the search pattern. Instead, the datum diametrically opposite datum 630 into the plane of FIG. 6B and the datum diametrically opposite datum 630 out of the plane of FIG. 6B are the first two positions evaluated. If they cannot be used for redistribution of the datum 630, then the four positions in layer L2 that are immediately adjacent datum 630 are evaluated in some predetermined order as described above. If layer L2 does not have enough positions immediately adjacent datum 630 to redistribute the datum 630, then the positions 642, 646 in the previous layer L1 at the next datum in the plane of FIG. 6B immediately adjacent datum 608 are evaluated and the corresponding positions 650, 654 in the next layer L3 are evaluated in some predetermined order. If a portion of the datum 630 remains to be distributed, then the positions in the previous layer L1 at the next datum out of the plane of FIG. 6B immediately adjacent datum 630 are evaluated and the corresponding data in the next layer L3 are evaluated in some predetermined order.

Figure 7A:
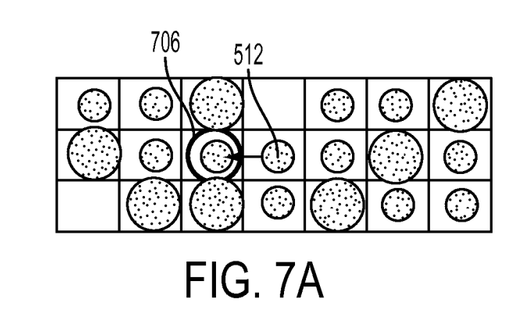
FIG. 7A and FIG. 7B illustrate expansion of the techniques discussed with reference to FIG. 4A, FIG. 4B, FIG. 4C, FIG. 5A and FIG. 5B when the scenario of FIG. 5C is encountered.
Figure 7B:
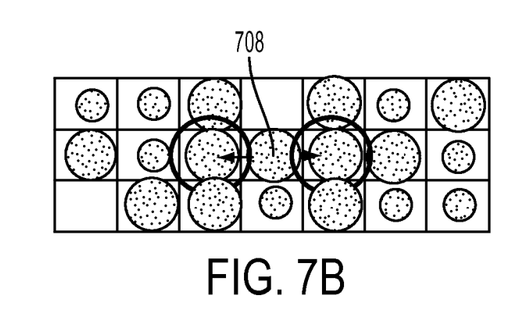

FIG. 7A depicts the further processing that occurs in response to the situation shown in FIG. 5C. Once the process determines that none of the immediately adjacent data to the datum corresponding to the malfunctioning inkjet are less than the datum corresponding to the malfunctioning inkjet, then a second evaluation of the immediately adjacent data occurs. In this second evaluation, the immediately adjacent data are compared to a maximum datum value and, if the datum at a position is less than the maximum datum value, it is incremented and the datum corresponding to the malfunctioning inkjet is decremented. This process is depicted pictorially in FIG. 7A with the datum 512 from FIG. 5C being used to increment the datum 706, as represented by the circle around the solid circle, to the next larger drop volume and the datum 512 is decremented. The distribution of the datum 512 is then complete. If the redistribution was not complete, the process attempts to distribute the remaining datum over the data immediately adjacent to the datum 512. If that effort does not finish distribution of the datum corresponding to the malfunctioning inkjet, then the search pattern is expanded, as shown in FIG. 7A. Again, the process compares the datum at a position within the pattern to the maximum datum value to enable datum closer to the datum corresponding to the malfunctioning inkjet to be increased before positions further from the malfunctioning inkjet datum are evaluated. For example, as shown in FIG. 7B, the large volume drop datum 708 is distributed to the datum corresponding to smaller volume drops on the immediate right and left of the datum for the malfunctioning inkjet before being used to increment a smaller datum more distant from pixel 708 or to increment the zero value shown in the figure. The process shown in FIG. 7 can be performed without the processes shown in FIG. 4 or 5.

Figure 8:
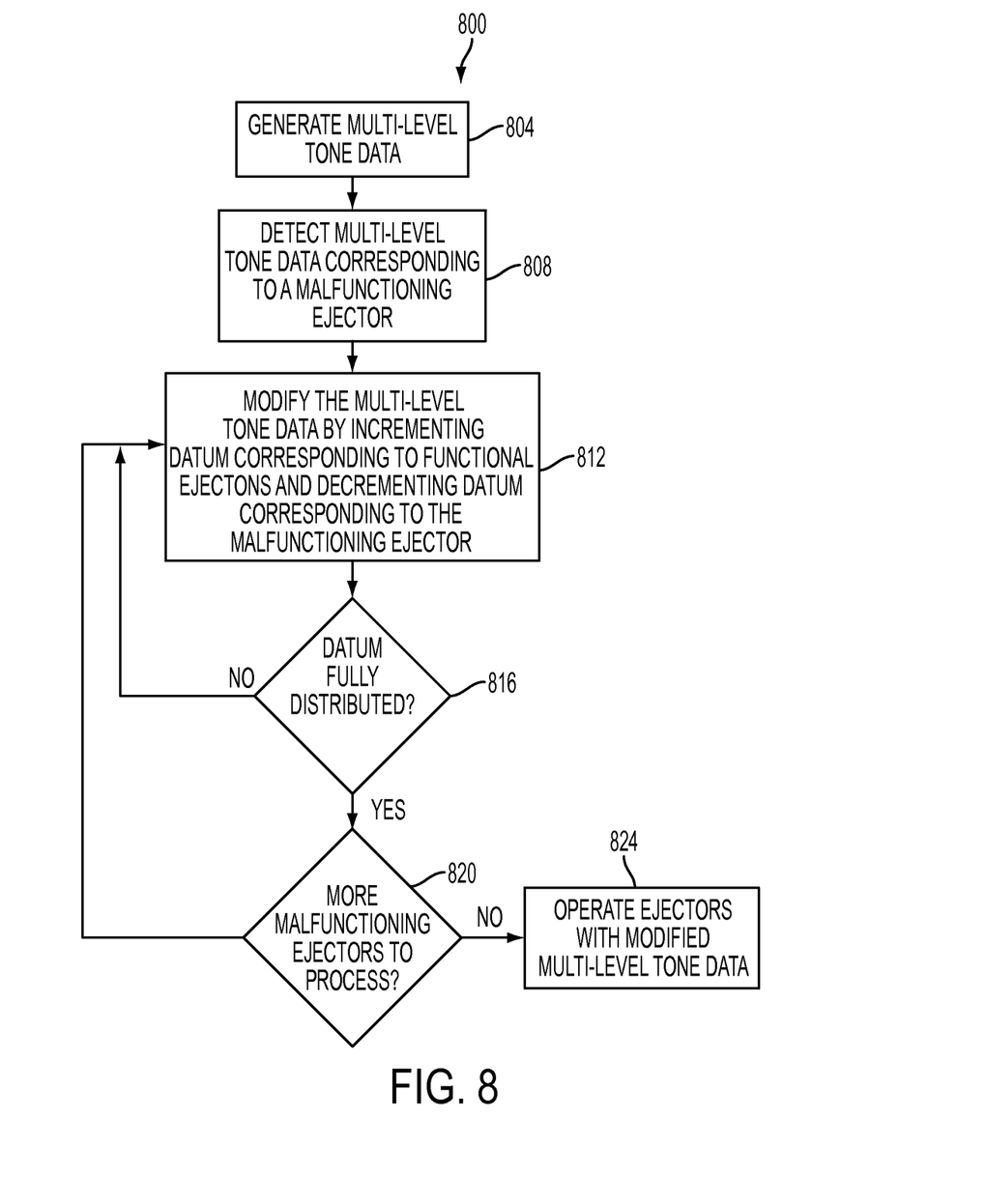
FIG. 8 is a flow diagram depicting a process for modifying multi-level tone data corresponding to functional ejectors that are adjacent multi-level tone data corresponding to a malfunctioning ejector.

FIG. 8 depicts a process 800 for distributing datum for a malfunctioning inkjet or ejector. In the description of this process, statements that the process is performing some task or function refers to a controller or general purpose processor executing programmed instructions stored in a memory operatively connected to the controller or processor to manipulate data or to operate one or more components in the printer to perform the task or function. The controller 108 noted above can be such a controller or processor. Alternatively, the controller 108 can be implemented with more than one processor and associated circuitry and components, each of which is configured to form one or more tasks or functions described herein.

The printer 60 can be configured in the manner noted above to perform to process 800 and is referenced by way of example. The process begins by generating multi-level tone data for each ink color in an image or for each material in each layer of a three-dimensional object (block 804). The controller 108 receives continuous tone data and applies at least two thresholds to the continuous tone data to generate the multi-level tone data for one or more bitmaps. Process 800 detects multi-level tone data that corresponds with a malfunctioning inkjet or ejector (block 808). This detection can be performed by the controller 108 moving the ejector heads 86 to the detection module 112, where the ejector heads 86 print a test pattern that is analyzed by the detection module 112. The detection module 112 generates and sends a signal identifying one or more malfunctioning ejectors to the controller 108. The controller 108 determines which data of the multi-level tone data for one or more bitmaps are associated with a malfunctioning ejector.

The process 800 modifies the multi-level tone data by decrementing each multi-level datum corresponding to a detected malfunctioning ejector and correspondingly incrementing at least one multi-level tone datum that is less than a maximum multi-tone datum (block 812). In one embodiment, the controller 108 searches the immediately adjacent data around the datum corresponding to the malfunctioning ejector to find a pixel that corresponds to a functional ejector and that has a multi-level tone value that is less than the datum corresponding to the malfunctioning ejector. When a candidate datum is found, the controller 108 increments the multi-level tone value for the candidate datum and decrements the datum corresponding to the malfunctioning ejector. The datum can be located in the bitmap that contains the datum corresponding to the malfunctioning ejector or the modified datum can be located in another bitmap as explained below. This process continues until the datum for the malfunctioning ejector is completely or almost completely distributed (block 816). In one embodiment, if all of the immediately adjacent data have been evaluated and determined to have datum equal to or greater than the datum for the malfunctioning inkjet or ejector, then either the search pattern is expanded to evaluate more distant data or the data for the immediately adjacent pixels are compared to a maximum multi-level tone data value. If the datum is less than the maximum multi-level tone data value, the datum is incremented and the datum for the malfunctioning ejector is decremented until all of the immediately adjacent data have been incremented to the maximum multi-level tone data value or the datum for the malfunctioning ejector has been completely or almost completely distributed. Once all of the data corresponding to a malfunctioning ejector has been processed (block 820), the modified multi-level tone data are used to operate the ejectors (block 824).

In the process 800, the controller implementing the process can also evaluate datum in bitmaps for other color separations or for other materials. In some cases, the datum corresponding to a malfunctioning ejector ejects material for a pixel in which another ejector ejects another color or material to produce a secondary or tertiary color or to mix materials at a particular location. This scenario is similar to the investigation of data in another layer of material described above except the other color or material is in another bitmap for the same layer. The datum corresponding to the malfunctioning ejector can be distributed to the data in another bitmap for the other material or color to be ejected onto or with the material to be ejected by the malfunctioning ejector. Only if the data for these ejectors are already at the highest value possible for the multi-level tone data are these data not incremented. That is, because these ejectors are ejecting material into the same pixel as the malfunctioning inkjet they are closer than the data corresponding to the ejectors adjacent to the malfunctioning inkjet in the same bitmap. Consequently, the data for the ejectors in the other bitmaps are incremented and the datum corresponding to the malfunctioning ejector is decremented to distribute completely or almost completely the datum for the malfunctioning ejector.

The distribution of the datum corresponding to the malfunctioning ejector is sometimes only partially distributed because the volume of ink associated with an incrementing of a datum can be a different size than a volume of ink associated with a decrementing of a datum for the malfunctioning ejector. For example, as discussed previously, the values 0, 1, 2 and 3 can represent ink drops having volumes of 0 pl, 5 pl, 7 pl and 12 pl, respectively. Consequently, the decrementing of a datum having a value of 2 reduces the amount of ink by only 2 pl, but the incrementing of a zero datum to one represents an additional ejection of 5 pl. Consequently, the controllers in some embodiments compute the volume of ink that corresponds to a datum for a malfunctioning ejector and then adjusts that volume with reference to the modification of the adjacent data until the remaining volume is less than some predetermined threshold. Similarly, in the embodiments that adjust the data for ejectors in other bitmaps that eject material into the pixel location corresponding to a datum for a malfunctioning ejector, the controller can adjust the volume corresponding to the malfunctioning ejector with reference to volumes according to the increments of the adjusted data.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A method of controlling ejectors in a printer comprising:
   generating multi-level tone data for at least one material to be ejected onto a substrate with reference to continuous tone data, each multi-level tone datum of the multi-level tone data having at least three possible values and each continuous tone datum having at least one more possible value than the multi-level tone datum;
   detecting multi-level tone data that corresponds to a malfunctioning ejector that ejects the material;
   modifying the generated multi-level tone data by decrementing each multi-level tone datum corresponding to the malfunctioning ejector and correspondingly incrementing at least one multi-level tone datum within the generated multi-level tone data in which a multi-level tone datum is stored that is less than a maximum multi-level tone datum, the at least one incremented multi-level tone datum corresponding to at least one functional ejector that is adjacent to the malfunctioning ejector; and
   operating the at least one functional ejector with reference to the modified generated multi-level tone data to eject ink onto a substrate.

2. The method of claim 1, the modification of the generated multi-level tone data further comprising:
   incrementing the at least one multi-level tone datum in response to the at least one multi-level tone datum being less than the multi-level tone datum corresponding to the malfunctioning ejector; and
   incrementing at least one other multi-level tone datum that is less than the maximum multi-level tone datum in response to the multi-level tone datum corresponding to the malfunctioning ejector not being decremented to zero after the at least one multi-level tone datum is incremented.

3. The method of claim 2, the incrementing of the at least one other multi-level tone datum occurs in response to all multi-level tone data, which are immediately adjacent to the multi-level tone datum corresponding to the malfunctioning ejector, are either incremented or unmodified because the at least one other multi-level tone datum is equal to or greater than the multi-level tone datum corresponding to the malfunctioning ejector.

4. The method of claim 3, the incrementing of the at least one other multi-level datum further comprising:
   incrementing at least one other multi-level datum that is not immediately adjacent the multi-level tone datum that corresponds to the malfunctioning ejector.

5. The method of claim 1, the operation of the at least one functional ejector further comprising:

operating the at least one functional ejector to eject a number of drops of ink that corresponds to the modified multi-level tone datum for a single position on the substrate.

6. The method of claim 1, the operation of the at least one functional ejector further comprising:
operating the at least one functional ejector to eject a predetermined volume for a single drop of material that corresponds to the multi-level tone datum for a pixel on the substrate.

7. The method of claim 1 wherein the at least one functional inkjet that is adjacent to the malfunctioning ejector ejects material at a same pixel on the substrate that corresponds to the malfunctioning ejector.

8. The method of claim 1 wherein the at least one functional inkjet that is adjacent to the malfunctioning ejector ejects a material that is different than a material corresponding to the malfunctioning ejector.

9. The method of claim 1, the decrementing of the datum corresponding to the malfunctioning ejector further comprising:
identifying a first volume of material with reference to the datum corresponding to the malfunctioning ejector;
identifying a second volume of material with reference to the incrementing of the datum corresponding to the at least one functional ejector; and reducing the identified first volume of material by the identified second volume of material; and
stopping the incrementing of data corresponding to adjacent functional ejectors in response to the reduced first volume of material being less than a predetermined threshold.

10. An inkjet printer comprising:
a printhead having a plurality of inkjets configured to jet ink drops;
a memory; and
a controller operatively connected to the printhead and the memory, the controller being configured to: generate multi-level tone data for at least one material to be ejected onto a substrate with reference to continuous tone data, each multi-level tone datum of the multi-level tone data having at least three possible values and each continuous tone datum having at least one more possible value than the multi-level tone datum;
detect multi-level tone data that corresponds to a malfunctioning ejector that ejects the material;
modify the generated multi-level tone data by decrementing each multi-level tone datum corresponding to the malfunctioning ejector and correspondingly incrementing at least one multi-level tone datum within the generated multi-level tone data in which a multi-level tone datum is stored that is less than a maximum multi-level tone datum, the at least one incremented multi-level tone datum corresponding to at least one functional ejector that is adjacent to the malfunctioning ejector; and
operate the at least one functional ejector with reference to the modified generated multi-level tone data to eject ink onto a substrate.

11. The printer of claim 10, the controller being further configured to:
increment the at least one multi-level tone datum in response to the at least one multi-level tone datum being less than the multi-level tone datum corresponding to the malfunctioning ejector; and
increment at least one other multi-level tone datum that is less than the maximum multi-level tone datum in response to the multi-level tone datum corresponding to the malfunctioning ejector not being decremented to zero after the at least one multi-level tone datum is incremented.

12. The printer of claim 11, the controller being further configured to:
increment the at least one other multi-level tone datum in response to all multi-level tone data immediately adjacent to the multi-level tone datum corresponding to the malfunctioning ejector being incremented or unmodified because the at least one other multi-level tone datum is equal to or greater than the multi-level tone datum corresponding to the malfunctioning ejector.

13. The printer of claim 12, the controller being further configured to increment the at least one other multi-level datum by: incrementing at least one other multi-level datum that is not immediately adjacent the multi-level tone datum that corresponds to the malfunctioning inkjet.

14. The printer of claim 10, the controller being further configured to: operate the at least one functional ejector to eject a number of drops of ink that corresponds to the modified multi-level tone datum for a single position on the substrate.

15. The printer of claim 10, the controller being further configured to: operate the at least one functional ejector to eject a predetermined volume for a single drop of material that corresponds to the multi-level tone datum for a pixel on the substrate.

16. The printer of claim 10 wherein the at least one functional inkjet that is adjacent to the malfunctioning ejector ejects material at a same pixel on the substrate that corresponds to the malfunctioning ejector.

17. The printer of claim 10 wherein the at least one functional inkjet that is adjacent to the malfunctioning ejector ejects a material that is different than a material corresponding to the malfunctioning ejector.

18. The printer of claim 10, the controller being further configured to:
identify a first volume of material with reference to the datum corresponding to the malfunctioning ejector;
identify a second volume of material with reference to the incrementing of the datum corresponding to the at least one functional ejector; and
reduce the identified first volume of material by the identified second volume of material; and
stop the incrementing of data corresponding to adjacent functional ejectors in response to the reduced first volume of material being less than a predetermined threshold.

* * * * *